(12) United States Patent
Igeta et al.

(10) Patent No.: US 12,306,500 B2
(45) Date of Patent: May 20, 2025

(54) ALIGNMENT PROCESSING DEVICE AND MANUFACTURING METHOD OF LIQUID CRYSTAL OPTICAL ELEMENT

(71) Applicants: Japan Display Inc., Tokyo (JP); OSAKA UNIVERSITY, Suita (JP)

(72) Inventors: Koichi Igeta, Tokyo (JP); Ayaka Higuchi, Tokyo (JP); Junji Kobashi, Tokyo (JP); Yasushi Tomioka, Tokyo (JP); Shinichiro Oka, Tokyo (JP); Hiroyuki Yoshida, Suita (JP)

(73) Assignees: Japan Display Inc., Tokyo (JP); Osaka University, Osaka (JP)

( * ) Notice: Subject to any disclaimer, the term of this patent is extended or adjusted under 35 U.S.C. 154(b) by 0 days.

(21) Appl. No.: 18/660,333

(22) Filed: May 10, 2024

(65) Prior Publication Data

US 2024/0377681 A1 Nov. 14, 2024

(30) Foreign Application Priority Data

May 11, 2023 (JP) .................................. 2023-078595

(51) Int. Cl.
*G02F 1/1335* (2006.01)
*G02F 1/1337* (2006.01)

(52) U.S. Cl.
CPC .. *G02F 1/133788* (2013.01); *G02F 1/133509* (2013.01); *G02F 1/13355* (2021.01)

(58) Field of Classification Search
CPC ......... G02F 1/133788; G02F 1/133509; G02F 1/13355
See application file for complete search history.

(56) References Cited

U.S. PATENT DOCUMENTS

| | | | |
|---|---|---|---|
| 2005/0225695 A1* | 10/2005 | Arai | G02B 27/28 349/74 |
| 2016/0033698 A1 | 2/2016 | Escuti et al. | |
| 2017/0371207 A1* | 12/2017 | Lan | G02F 1/133723 |
| 2020/0393716 A1* | 12/2020 | Ogawara | G03F 1/00 |
| 2022/0066076 A1* | 3/2022 | Sasata | G02B 5/1857 |

FOREIGN PATENT DOCUMENTS

JP 2017522601 A 8/2017

* cited by examiner

*Primary Examiner* — Donald L Raleigh
(74) *Attorney, Agent, or Firm* — Maier & Maier, PLLC

(57) ABSTRACT

According to one embodiment, an alignment processing device includes a light source, a polarizing beam splitter, a first optical system, a second optical system, a first retardation film, a second retardation film, a moving mechanism configured to move a processing substrate in which a thin film is formed, and a controller. Interfering light is formed in an exposure area by first circularly polarized light and second circularly polarized light. The controller performs control so as to repeat a process of exposing part of an area of the thin film by the interfering light and a process of moving the processing substrate.

7 Claims, 16 Drawing Sheets

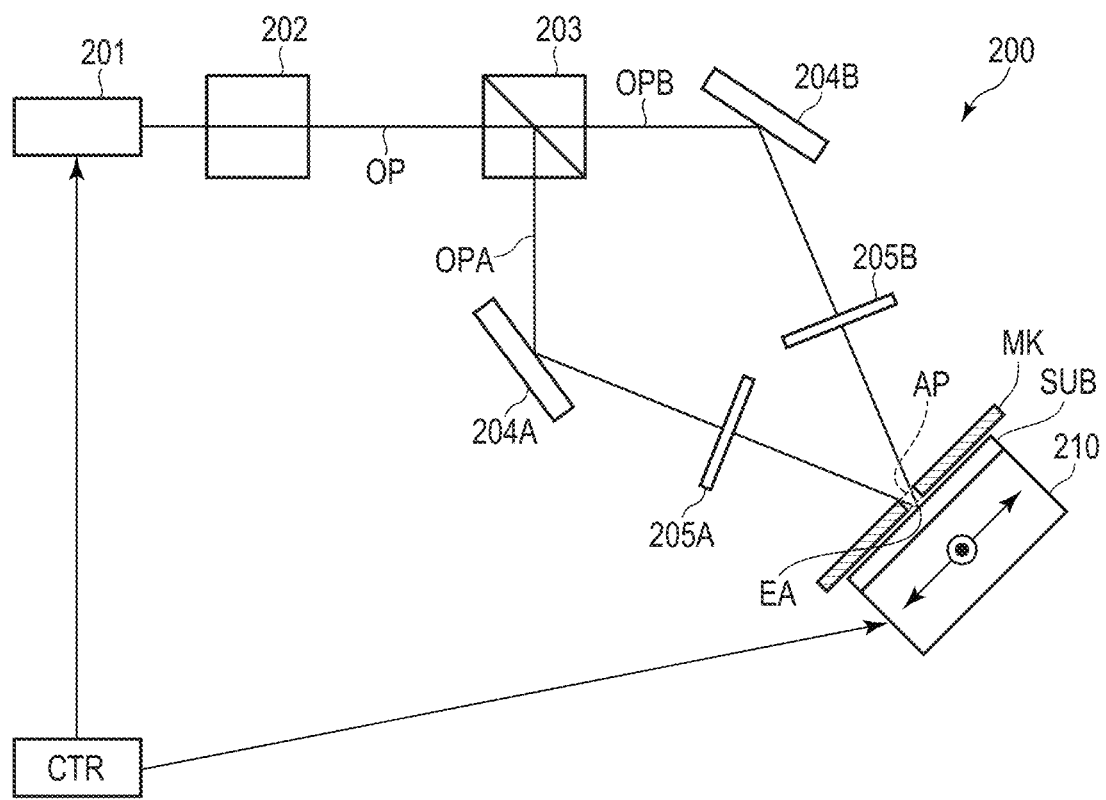
F I G. 6

ALIGNMENT PROCESSING DEVICE AND MANUFACTURING METHOD OF LIQUID CRYSTAL OPTICAL ELEMENT

CROSS-REFERENCE TO RELATED APPLICATIONS

This application is based upon and claims the benefit of priority from Japanese Patent Application No. 2023-078595, filed May 11, 2023, the entire contents of which are incorporated herein by reference.

FIELD

Embodiments described herein relate generally to an alignment processing device and a manufacturing method of a liquid crystal optical element.

BACKGROUND

For example, a liquid crystal polarization grating using a liquid crystal material is suggested. This liquid crystal polarization grating requires the adjustment of parameters such as a grating period, the refractive anisotropy Δn of a liquid crystal layer (the difference between refractive index ne for extraordinary light and refractive index no for ordinary light in a liquid crystal layer) and the thickness d of the liquid crystal layer.

BRIEF DESCRIPTION OF THE DRAWINGS

FIG. 6 is a diagram showing a configuration example of an alignment processing device 200.

DETAILED DESCRIPTION

Figure 1:
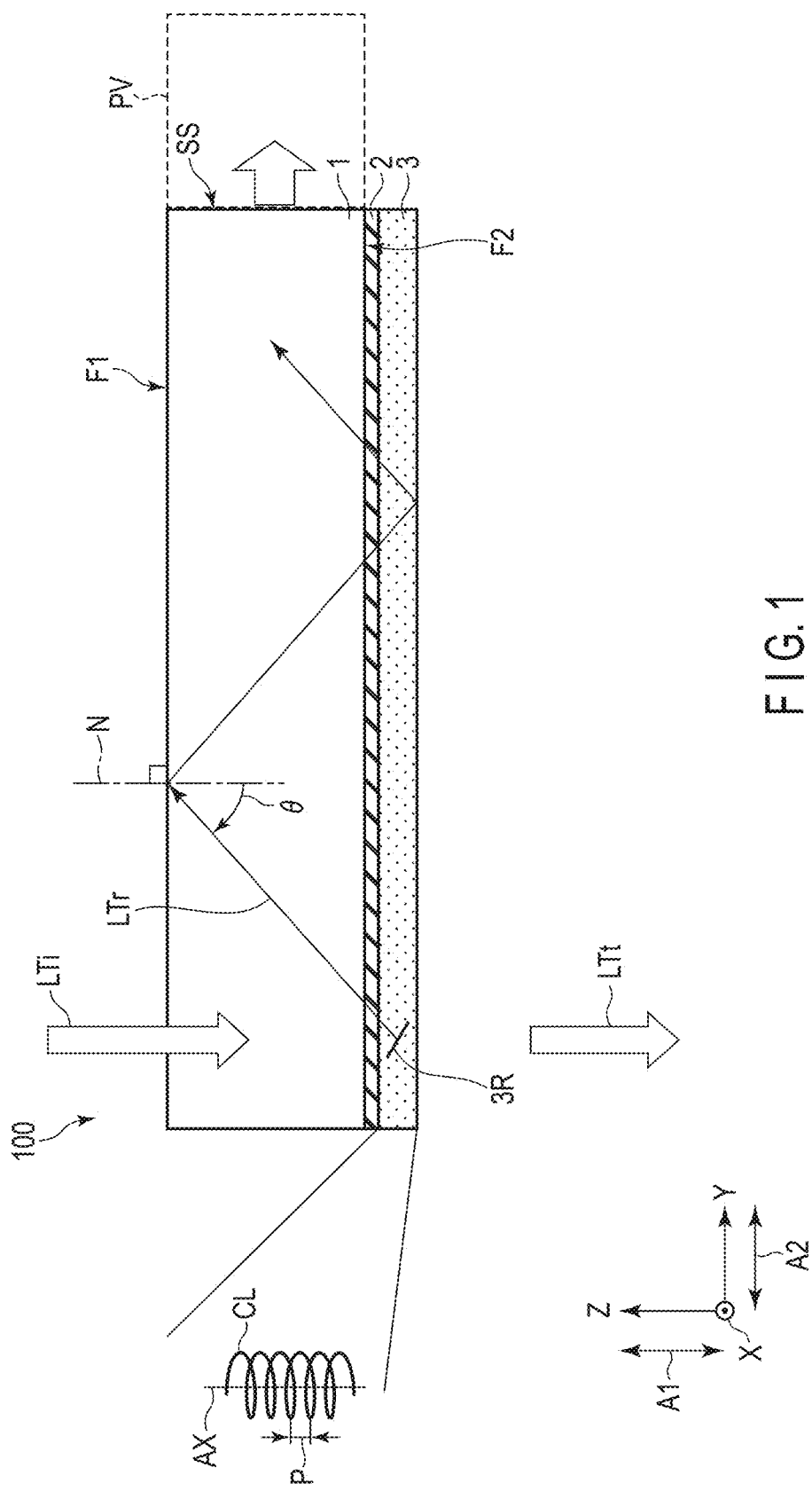
FIG. 1 is a cross-sectional view schematically showing a liquid crystal optical element 100.

Embodiments described herein aim to provide an alignment processing device for manufacturing a liquid crystal optical element whose area can be increased and a manufacturing method of such a liquid crystal optical element.

In general, according to one embodiment, an alignment processing device comprises a light source, a polarizing beam splitter which divides light emitted from the light source into first linearly polarized light and second linearly polarized light, a first optical system which guides the first linearly polarized light to an exposure area, a second optical system which guides the second linearly polarized light to the exposure area, a first retardation film which converts the first linearly polarized light into first circularly polarized light, a second retardation film which converts the second linearly polarized light into second circularly polarized light which rotates in an opposite direction of the first circularly polarized light, a moving mechanism configured to move a processing substrate in which a thin film is formed on a main surface of a transparent substrate in a direction parallel to the main surface, and a controller which controls the light source and the moving mechanism. Interfering light is formed in the exposure area by the first circularly polarized light and the second circularly polarized light. The controller performs control so as to repeat a process of exposing part of an area of the thin film by the interfering light and a process of moving the processing substrate.

According to another embodiment, a manufacturing method of a liquid crystal optical element comprises preparing a processing substrate in which a thin film is formed on a main surface of a transparent substrate; performing alignment treatment for forming a pattern of alignment axes in the thin film; forming an alignment film by baking the thin film; and forming a liquid crystal layer having a cholesteric liquid crystal on the alignment film. In the alignment treatment, the processing substrate is placed at a first position. A first area of the thin film is exposed by interfering light of first circularly polarized light and second circularly polarized light which rotate in opposite directions. The processing substrate is moved and is placed at a second position. A second area of the thin film is exposed by the interfering light.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the Z-axis is referred to as a Z-direction or a first direction A1. A direction parallel to the Y-axis is referred to as a Y-direction or a second direction A2. A direction parallel to the X-axis is referred to as an X-direction or a third direction A3. The plane defined by the X-axis and the Y-axis is referred to as an X-Y plane. The plane defined by the X-axis and the Z-axis is referred to as an X-Z plane. The plane defined by the Y-axis and the Z-axis is referred to as a Y-Z plane.

FIG. 1 is a cross-sectional view schematically showing a liquid crystal optical element 100.

The liquid crystal optical element 100 comprises a transparent substrate 1, an alignment film 2 and a liquid crystal layer 3.

The transparent substrate 1 consists of, for example, a transparent glass plate or a transparent synthetic resin plate. The transparent substrate 1 may consist of, for example, a transparent synthetic resin plate having flexibility. The transparent substrate 1 could have an arbitrary shape. For example, the transparent substrate 1 may be curved.

In this specification, the term "light" includes visible light and invisible light. For example, the wavelength of the lower limit of the visible light range is greater than or equal to 360 nm and less than or equal to 400 nm. The wavelength of the upper limit of the visible light range is greater than or equal to 760 nm and less than or equal to 830 nm. Visible light includes the first component (blue component) of a first wavelength range (for example, 400 nm to 500 nm), the second component (green component) of a second wavelength range (for example, 500 nm to 600 nm), and the third component (red component) of a third wavelength range (for example, 600 nm to 700 nm). Invisible light includes the wavelength range of ultraviolet in which the wavelength is shorter than the first wavelength range, and the wavelength range of infrared light in which the wavelength is longer than the third wavelength range.

In this specification, the term "transparent" should preferably mean "colorless and transparent". However, the term "transparent" may mean "semitransparent" or "colored and transparent".

The transparent substrate 1 is shaped like a flat plate parallel to an X-Y plane and has a first main surface (outer surface) F1, a second main surface (inner surface) F2 and a side surface SS. The first main surface F1 and the second main surface F2 are surfaces substantially parallel to an X-Y plane and face each other in a first direction A1. The side surface SS is a surface extending in the first direction A1. In the example shown in FIG. 1, the side surface SS is a surface substantially parallel to an X-Z plane. The side surface SS includes a surface substantially parallel to a Y-Z plane.

The alignment film 2 is provided on the second main surface F2. The alignment film 2 is a horizontal alignment film having an alignment restriction force parallel to an X-Y plane. The alignment film 2 is, for example, an optical alignment film to which alignment treatment is applied by light irradiation.

The liquid crystal layer 3 overlaps the alignment film 2 in the first direction A1. In other words, the alignment film 2 is located between the transparent substrate 1 and the liquid crystal layer 3 and is in contact with the transparent substrate 1 and the liquid crystal layer 3.

The liquid crystal layer 3 has a cholesteric liquid crystal CL as schematically shown in the enlarged view. The cholesteric liquid crystal CL has a helical axis AX substantially parallel to the first direction A1 and has helical pitch P parallel to the first direction A1. Helical pitch P indicates one period of the helix (in other words, the layer thickness parallel to the helical axis AX and required for a 360-degree rotation of the liquid crystal molecule).

This liquid crystal layer 3 is configured to reflect, of light LTi which enters the liquid crystal optical element 100, circularly polarized light having a selective reflection range determined based on helical pitch P and the refractive anisotropy Δn of the liquid crystal layer 3. In this specification, reflection in the liquid crystal layer 3 is accompanied by diffraction inside the liquid crystal layer 3.

The liquid crystal layer 3 has a reflective surface 3R which reflects circularly polarized light corresponding to the twist direction of the cholesteric liquid crystal CL in the selective reflection range. The reflective surface 3R inclines with respect to an X-Y plane. In this specification, circularly polarized light may be strict circularly polarized light or may be circularly polarized light which approximates elliptically polarized light.

In the example shown in FIG. 1, the liquid crystal layer 3 is configured such that part of light LTi which enters the liquid crystal optical element 100 from the main surface F1 side is reflected toward the transparent substrate 1.

It should be noted that a liquid crystal layer which contains another cholesteric liquid crystal may be stacked on the liquid crystal layer 3 shown in FIG. 1 in the liquid crystal optical element 100. Such a cholesteric liquid crystal is, for example, a cholesteric liquid crystal having a helical pitch which is different from helical pitch P or a cholesteric liquid crystal which twists in the opposite direction of the twist direction of the cholesteric liquid crystal CL shown in the figure.

Now, this specification explains the optical effect of the liquid crystal optical element 100 shown in FIG. 1.

Light LTi which enters the liquid crystal optical element 100 includes, for example, visible light, ultraviolet light and infrared light.

In the example shown in FIG. 1, in order to facilitate understanding, light LTi is assumed to enter the transparent substrate 1 so as to be substantially perpendicular to the transparent substrate 1. It should be noted that the incident angle of light LTi with respect to the transparent substrate 1 is not particularly limited.

Light LTi passes through the transparent substrate 1 and the alignment film 2 and enters the liquid crystal layer 3. The liquid crystal layer 3 reflects part of light LTi on the reflective surface 3R and transmits the other part of light LTi (in other words, light LTt). The reflected light LTr is circularly polarized light having a wavelength A.

For example, light LTr is left-handed circularly polarized light having the wavelength range of infrared light. Light LTt includes right-handed circularly polarized light having the wavelength range of infrared light in addition to visible light and ultraviolet light.

The entering angle θ of light LTr reflected on the liquid crystal layer 3 is set so as to satisfy optical waveguide conditions. Here, the entering angle θ corresponds to an angle greater than or equal to a critical angle which causes total reflection on the interface between the liquid crystal layer 3 and air. The entering angle θ indicates an angle with respect to the normal N of the transparent substrate 1.

When the transparent substrate 1, the alignment film 2 and the liquid crystal layer 3 have substantially the same refractive index, a stacked layer body of these elements could be a light guide element as a single unit. In this case, light LTr is guided toward the side surface SS while repeating reflection on the interface between the transparent substrate 1 and air and the interface between the liquid crystal layer 3 and air.

This liquid crystal optical element 100 can be applied as, for example, the light guide element of a solar battery device. The solar battery device comprises the liquid crystal optical element 100 and a solar battery PV shown by dotted lines in FIG. 1. The solar battery PV is provided so as to face the side surface SS. The solar battery PV can receive light LTr emitted from the side surface SS and generate electricity.

In the example explained above, infrared light is reflected on the liquid crystal layer 3. However, the liquid crystal layer 3 may be configured to reflect visible light, or may be configured to reflect ultraviolet light or may be configured to reflect light in a plurality of wavelength ranges.

Figure 2:
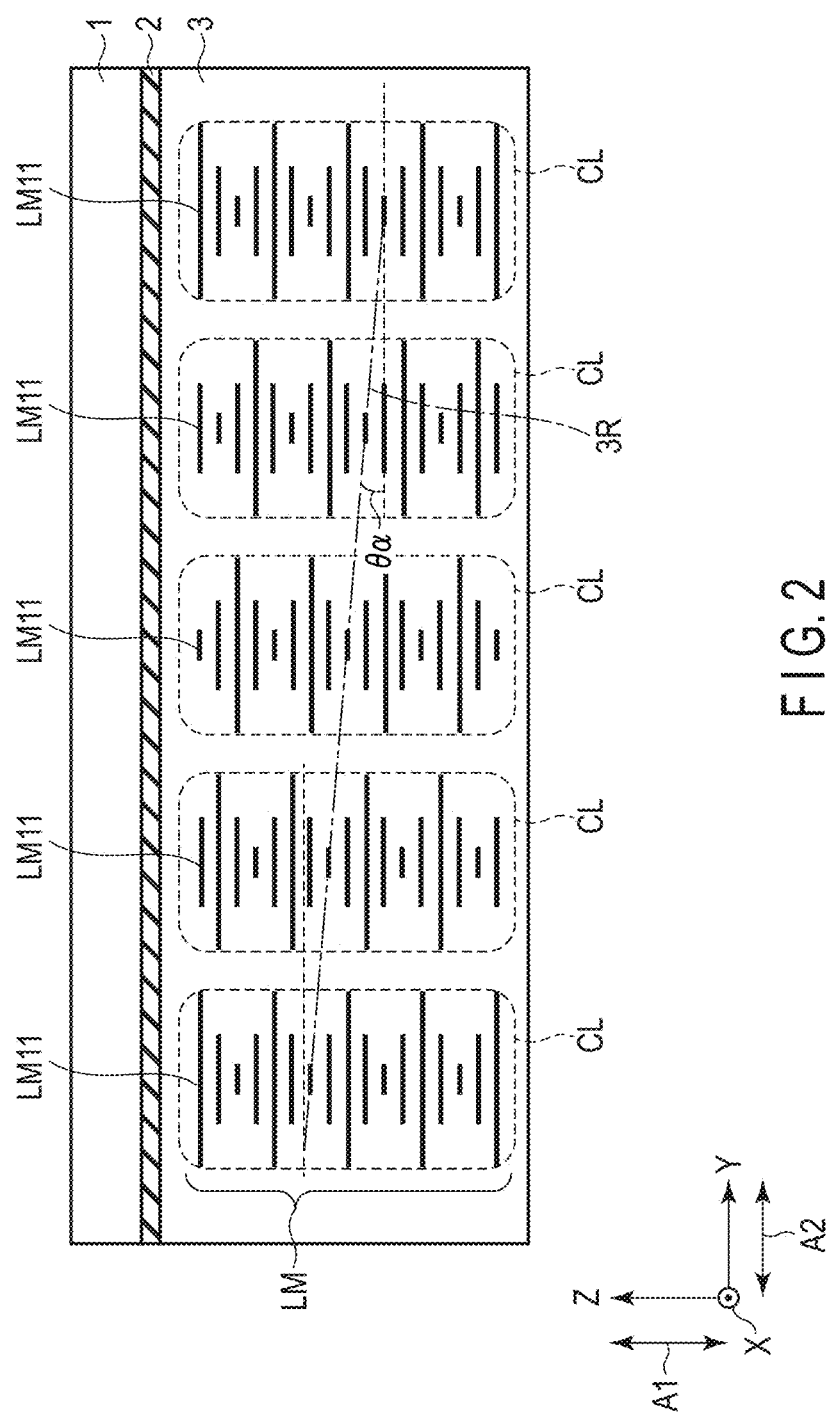
FIG. 2 is a diagram for explaining an example of cholesteric liquid crystals CL contained in a liquid crystal layer 3.

FIG. 2 is a diagram for explaining an example of cholesteric liquid crystals CL contained in the liquid crystal layer 3.

In FIG. 2, the liquid crystal layer 3 is enlarged in the first direction A1. In addition, to simplify the illustration, FIG. 2 shows one liquid crystal molecule LM among the liquid crystal molecules located on the same plane parallel to an X-Y plane as the liquid crystal molecules constituting each cholesteric liquid crystal CL. The alignment direction of each liquid crystal molecule LM shown in the figure corresponds to the average alignment direction of the liquid crystal molecules located on the same plane.

When one of the cholesteric liquid crystals CL surrounded by dotted lines is particularly looked at, the cholesteric liquid crystal CL consists of a plurality of liquid crystal molecules LM which are helically stacked in the first direction A1 while twisting. The liquid crystal molecules LM have a liquid crystal molecule LM11 located near the interface between the alignment film 2 and the liquid crystal layer 3.

In the liquid crystal layer 3 of the example shown in FIG. 2, the alignment directions of the cholesteric liquid crystals CL which are adjacent to each other in a second direction A2 are different from each other. Further, the spacial phases of the cholesteric liquid crystals CL which are adjacent to each other in the second direction A2 are different from each other.

The alignment directions of the liquid crystal molecules LM11 which are adjacent to each other in the second direction A2 are different from each other. The alignment directions of a plurality of liquid crystal molecules LM11 continuously change in the second direction A2.

The reflective surface 3R of the liquid crystal layer 3 shown by the one-dot chain line in the figure inclines with respect to an X-Y plane. The angle θα between the reflective surface 3R and an X-Y plane is an acute angle. The reflective surface 3R corresponds to a surface in which the alignment directions of the liquid crystal molecules LM are uniform, or a surface (an equiphase wave surface) in which the spacial phase is uniform.

This liquid crystal layer 3 is cured in a state where the alignment directions of the liquid crystal molecules LM are fixed. In other words, an electric field does not control the alignment directions of the liquid crystal molecules LM. For this reason, the liquid crystal optical element 100 does not comprise an electrode for forming an electric field in the liquid crystal layer 3.

In general, in the liquid crystal layer 3 having cholesteric liquid crystals CL, the selective reflection range $\Delta\lambda$ for the light which underwent perpendicular incidence is shown by the following formula (1) based on helical pitch P of the cholesteric liquid crystals CL and the refractive anisotropy $\Delta n$ of the liquid crystal layer 3 (the difference between refractive index ne for extraordinary light and refractive index no for ordinary light).

$$\Delta\lambda = \Delta n * P \quad (1)$$

The specific wavelength range of the selective reflection range $\Delta\lambda$ is a range from (no*P) or greater to (ne*P) or less.

The center wavelength $\lambda m$ of the selective reflection range $\Delta\lambda$ is shown by the following formula (2) based on helical pitch P of the cholesteric liquid crystals CL and the average refractive index nav (=(ne+no)/2) of the liquid crystal layer 3.

$$\lambda m = nav * P \quad (2)$$

Figure 3:
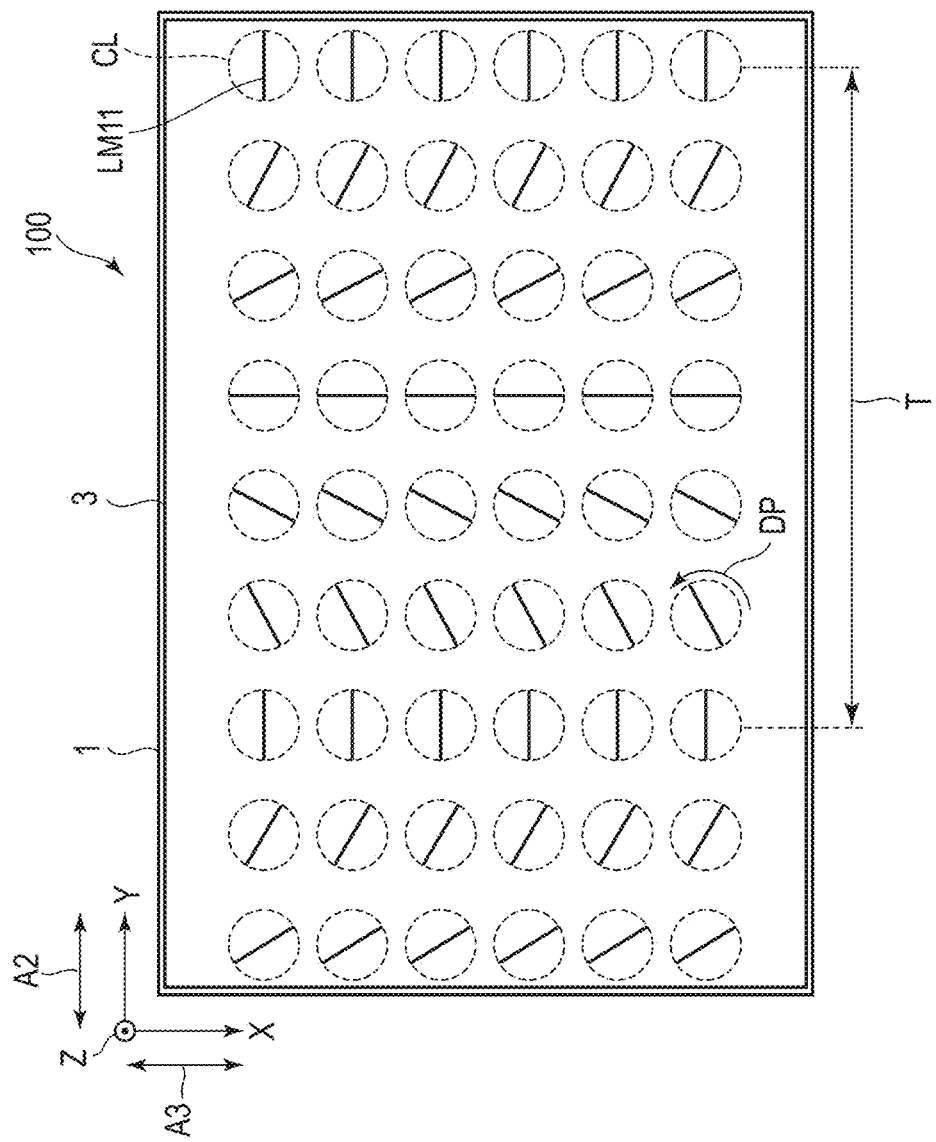
FIG. 3 is a plan view schematically showing the liquid crystal optical element 100.

FIG. 3 is a plan view schematically showing the liquid crystal optical element 100.

FIG. 3 shows an example of the spacial phases of cholesteric liquid crystals CL. Here, the spacial phases are shown as the alignment directions of the liquid crystal molecules LM11 located near the alignment film 2 among the liquid crystal molecules LM contained in cholesteric liquid crystals CL.

Regarding the cholesteric liquid crystals CL arranged in the second direction A2, the alignment directions of the liquid crystal molecules LM11 are different from each other. In other words, the spacial phases of the cholesteric liquid crystals CL differ in the second direction A2.

To the contrary, regarding the cholesteric liquid crystals CL arranged in a third direction A3, the alignment directions of the liquid crystal molecules LM11 are substantially coincident with each other. In other words, the spacial phases of the cholesteric liquid crystals CL are substantially coincident with each other in the third direction A3.

In particular, regarding the cholesteric liquid crystals CL arranged in the second direction A2, the alignment direction varies with each liquid crystal molecule LM11 by a certain degree. In other words, the alignment direction linearly varies with the liquid crystal molecules LM11 arranged in the second direction A2. Thus, the spacial phase linearly varies in the second direction A2 with the cholesteric liquid crystals CL arranged in the second direction A2. As a result, the reflective surface 3R which inclines with respect to an X-Y plane is formed as in the case of the liquid crystal layer 3 shown in FIG. 2. Here, the expression "linearly vary" means that, for example, the amount of variation in the alignment directions of the liquid crystal molecules LM11 is shown by a linear function. Here, the alignment direction of each liquid crystal molecule LM11 corresponds to the long axis direction of the liquid crystal molecule LM11 on an X-Y plane. The alignment direction of each liquid crystal molecule LM11 is controlled by the alignment treatment applied to the alignment film 2.

Here, the interval between two liquid crystal molecules LM11 when the alignment directions of the liquid crystal molecules LM11 vary by 180 degrees in the second direction A2 on a plane is defined as period T. In FIG. 3, DP indicates the twist direction of each liquid crystal molecule LM11. The inclination angle θα of the reflective surface 3R shown in FIG. 2 is arbitrarily set based on period T and helical pitch P. Period T is, for example, 1000 nm to 3000 nm. As another example, period T is 300 nm to 700 nm.

Figure 4:
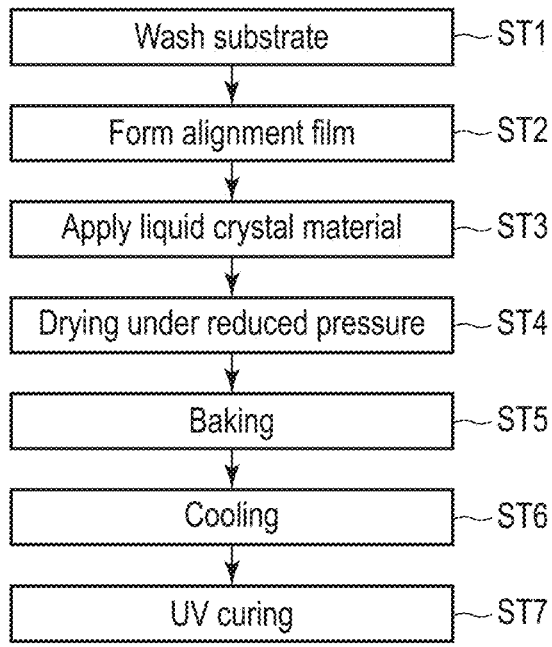
FIG. 4 is a diagram for explaining the manufacturing method of the liquid crystal optical element 100.

Now, this specification explains the manufacturing method of the liquid crystal optical element 100 with reference to FIG. 4.

First, the transparent substrate 1 is washed (step ST1).

Subsequently, the alignment film 2 is formed on the second main surface F2 of the transparent substrate 1 (step ST2). The alignment film 2 is formed by applying alignment treatment (photo-alignment treatment) to the thin film formed on the second main surface F2. The alignment film 2 formed by this alignment treatment has an alignment axis having a predetermined pattern. The formation process of the alignment film 2 is described later.

Subsequently, a liquid crystal material (a solution containing a monomer material for forming cholesteric liquid crystals) is applied to the upper side of the alignment film 2 (step ST3). Subsequently, the liquid crystal material is dried by decompressing the inside of the chamber (step ST4), and further, the liquid crystal material is baked (step ST5). Through this process, the liquid crystal molecules contained in the liquid crystal material are aligned in a predetermined direction based on the alignment axis of the alignment film 2. Subsequently, the liquid crystal material is cooled to approximately a room temperature (step ST6). Subsequently, the liquid crystal material is cured by irradiating it with ultraviolet light (step ST7). By this process, the liquid crystal layer 3 having cholesteric liquid crystals CL is formed.

Figure 5:
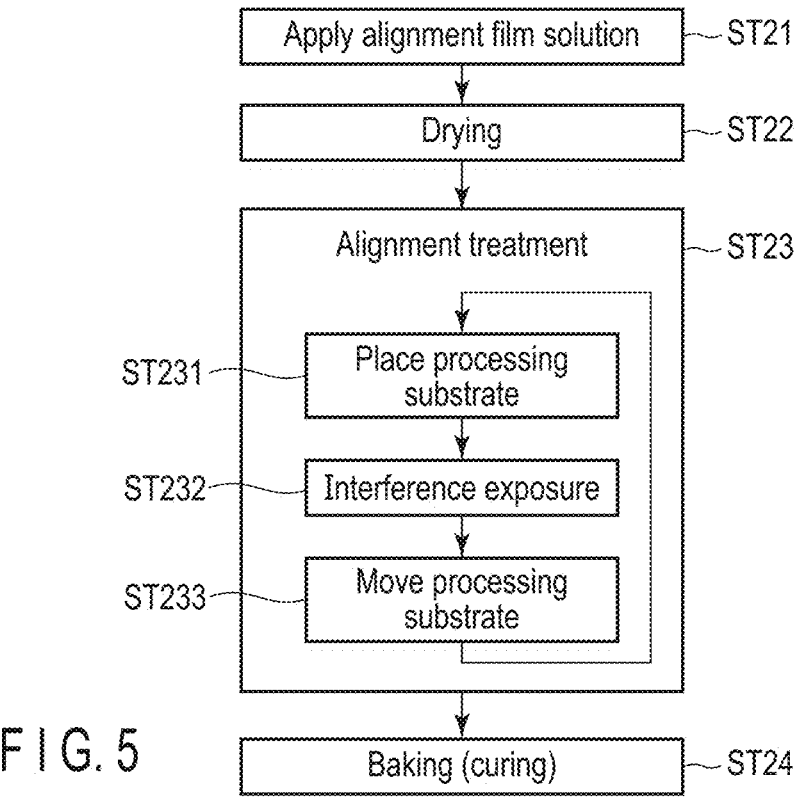
FIG. 5 is a diagram for explaining the formation process of an alignment film 2.

Now, this specification explains the formation process of the alignment film 2 with reference to FIG. 5.

First, an alignment film solution is applied to the upper side of the transparent substrate 1 (step ST21). The alignment film solution is a solution containing a monomer material for forming the alignment film 2. The method for applying the alignment film solution is not particularly limited. For example, the method may be spin coating which rotates the transparent substrate 1 at high speed after the alignment film solution is dropped on the transparent substrate 1. Alternatively, the alignment film solution may be applied by flexographic printing, or the alignment film solution may be applied by an ink jet method.

Subsequently, the applied alignment film solution is dried (step ST22). By this process, the solvent contained in the alignment film solution is eliminated. Through these step ST21 and step ST22, a processing substrate in which a thin film is formed on the second surface F2 of the transparent substrate 1 is prepared.

Subsequently, alignment treatment for forming the pattern of the alignment axis is applied to the thin film (step ST23). The alignment treatment is performed in the following procedure.

First, the processing substrate is placed at a first position (step ST231).

Subsequently, the first area of the thin film is exposed by irradiating the processing substrate with the interfering light of first circularly polarized light and second circularly polarized light which rotate in opposite directions (step ST232). The interfering light is light having the pattern of the interference fringes of the first circularly polarized light and the second circularly polarized light. The exposure time of one exposure is, for example, 90 seconds.

Subsequently, the processing substrate is moved (step ST233). The process returns to step ST231, and the processing substrate is placed at a second position different from the first position.

Subsequently, the second area of the thin film is exposed by interfering light as explained in step ST232.

By repeating step ST231 to step ST233 in this manner, a thin film having several times area of the exposure area in which interfering light is formed can be exposed in series. The pattern of alignment axes corresponding to the pattern of the interference fringes is formed in the exposed thin film.

Subsequently, the thin film is baked (step ST24). Through these alignment treatment and baking, the monomer material contained in the thin film is polymerized, and further, the thin film is cured in a state where each alignment axis is fixed. By this process, the alignment film 2 having the pattern of predetermined alignment axes is formed.

Now, this specification explains an alignment processing device 200 applied to the above alignment treatment.

FIG. 6 is a diagram showing a configuration example of the alignment processing device 200.

The alignment processing device 200 comprises a light source 201, an optical magnification system 202, a polarizing beam splitter 203, a first optical system 204A, a second optical system 204B, a first retardation film 205A, a second retardation film 205B, a moving mechanism 210 and a controller CTR.

The light source 201 is, for example, a laser light source which emits light having the wavelength range of ultraviolet. It should be noted that a light source 201 which emits light having a wavelength range different from that of ultraviolet could be applied depending on the type of the thin film to which alignment treatment is applied.

The polarizing beam splitter 203 divides the emitted light from the light source 201 into first linearly polarized light and second linearly polarized light. The optical magnification system 202 is provided in optical path OP between the light source 201 and the polarizing beam splitter 203 and magnifies the beam spot of the emitted light.

The first optical system 204A is provided in optical path OPA of the first linearly polarized light reflected by the polarizing beam splitter 203 and guides the first linearly polarized light to an exposure area EA.

The second optical system 204B is provided in optical path OPB of the second linearly polarized light which passed through the polarizing beam splitter 203 and guides the second linearly polarized light to the exposure area EA. Each of the first and second optical systems 204A and 204B shown in the figure consists of a planar mirror. It should be noted that each of them may consist of a plurality of planar mirrors.

The first retardation film 205A is provided in optical path OPA and converts the first linearly polarized light into the first circularly polarized light.

The second retardation film 205B is provided in optical path OPB and converts the second linearly polarized light into the second circularly polarized light. The second circularly polarized light is circularly polarized light which rotates in the opposite direction of the first circularly polarized light. These first retardation film 205A and second retardation film 205B are, for example, quarter-wave plates.

Interfering light is formed by the first circularly polarized light and the second circularly polarized light which reached the exposure area EA.

In the example shown in FIG. 6, the alignment processing device 200 comprises a mask MK having an aperture AP facing the exposure area EA. It should be noted that the mask MK should be provided in one of optical path OP, optical path OPA and optical path OPB between the light source 201 and the exposure area EA.

The moving mechanism 210 is configured to hold the processing substrate SUB so as to overlap the exposure area EA and move the processing substrate SUB. Here, the processing substrate SUB is formed through steps ST21 and ST22 of FIG. 5 and comprises a thin film for forming the alignment film 2.

The controller CTR controls the light source 201 and the moving mechanism 210. For example, the controller CTR controls the timing of light emission from the light source 201, the time of light emission, the power of light, etc. Further, the controller CTR controls the moving distance of the processing substrate SUB by the moving mechanism 210, the direction of movement, the timing of movement, etc. The controller CTR performs control such that the process of exposing part of the area of the thin film of the processing substrate SUB by interfering light by emitted light from the light source 201 and the process of moving the processing substrate SUB by the moving mechanism 210 are repeated.

Figure 7:
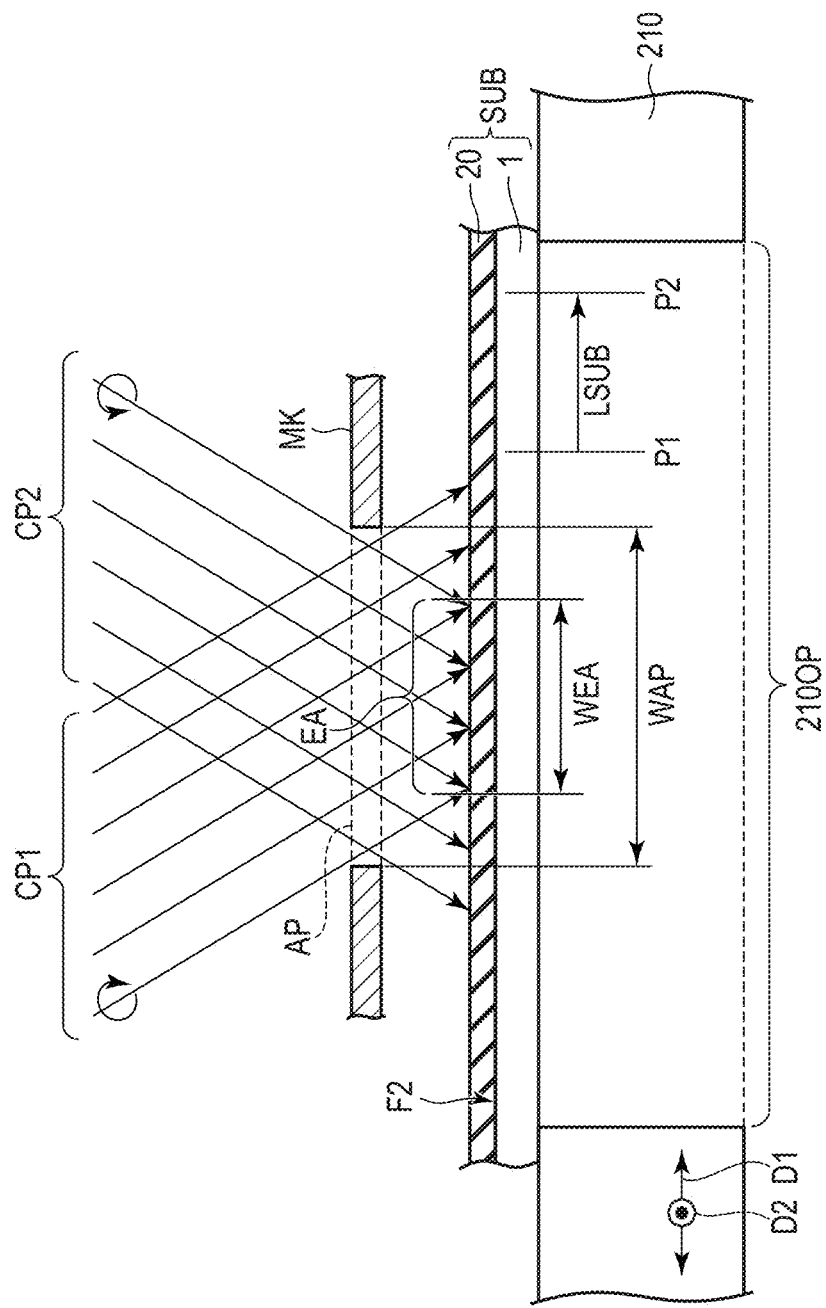
FIG. 7 is a diagram for explaining the process of exposing the thin film 20 of a processing substrate SUB in an exposure area EA.

FIG. 7 is a diagram for explaining the process of exposing the thin film 20 of the processing substrate SUB in the exposure area EA.

The processing substrate SUB comprises the thin film 20 for forming the alignment film on the second main surface F2 of the transparent substrate 1 as described above.

The moving mechanism 210 is configured to move the held processing substrate SUB in directions D1 and D2 parallel to the second main surface F2. Directions D1 and D2 are directions intersecting with (or orthogonal to) each other. For example, direction D1 is parallel to a direction (second direction A2) along the Y-axis shown in FIG. 3. Direction D2 is parallel to a direction (third direction A3) along the X-axis.

The moving mechanism 210 has an aperture 210OP facing the processing substrate SUB. The aperture 210OP overlaps the entire exposed area (areas S1, S2, . . . , Sn shown in FIG. 9 etc., later) of the thin film 20.

The mask MK is spaced apart from the processing substrate SUB, and is provided such that the aperture AP faces the exposure area EA.

The peripheral portion (in other words, a diffuse component spaced apart from the optical axis) of the beam spot of each of the first circularly polarized light CP1 and the second circularly polarized light CP2 is shielded by the mask MK. By this configuration, each beam spot is shaped so as to correspond to the shape of the aperture AP. The first circularly polarized light CP1 and the second circularly polarized light CP2 pass through the aperture AP of the mask MK, and subsequently, reach the exposure area EA and form interfering light. Part of the area of the thin film 20 is exposed by interfering light.

In the example shown in the figure, the first circularly polarized light CP1 is right-handed circularly polarized light, and the second circularly polarized light CP2 is left-handed circularly polarized light.

As described above, the moving mechanism 210 has the aperture 210OP. Thus, neither the first circularly polarized light CP1 nor the second circularly polarized light CP2 having passed through the processing substrate SUB is reflected on the moving mechanism 210. This configuration can prevent disorder to be caused in the alignment pattern by undesired reflected light on the moving mechanism 210.

After, of the thin film 20, the area overlapping the exposure area EA is exposed by interfering light in a state where the processing substrate SUB is placed at a first position P1, the processing substrate SUB moves in direction D1 and is placed at a second position P2. Subsequently, of the thin film 20, the area overlapping the exposure area EA is exposed by interfering light in a state where the processing substrate SUB is placed at the second position P2. At this time, the moving distance LSUB from the first position P1 to the second position P2 of the processing substrate SUB in direction D1 is less than width WEA of the exposure area EA in direction D1. Thus, a plurality of areas of the thin film 20 can be exposed without forming any void (unexposed area).

It should be noted that width WAP of the aperture AP in direction D1 is greater than width WEA of the exposure area EA.

Figure 8:
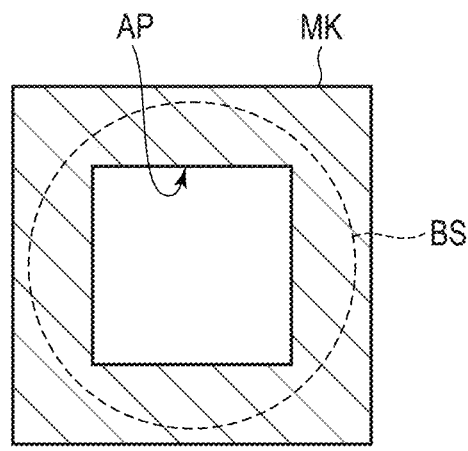
FIG. 8 is a plan view showing an example of a mask MK.

FIG. 8 is a plan view showing an example of the mask MK.

The mask MK has a square aperture AP. The area of the aperture AP is less than that of the beam spot BS shown by the dotted line. Thus, the peripheral portion of the beam spot BS is shielded by the mask MK. The exposure area EA shown in FIG. 7 is formed into a square shape corresponding to the shape of the aperture AP.

For example, the diameter of the beam spot BS is 10 cm, and the length of each side of the aperture AP is 7 cm.

Figure 9:
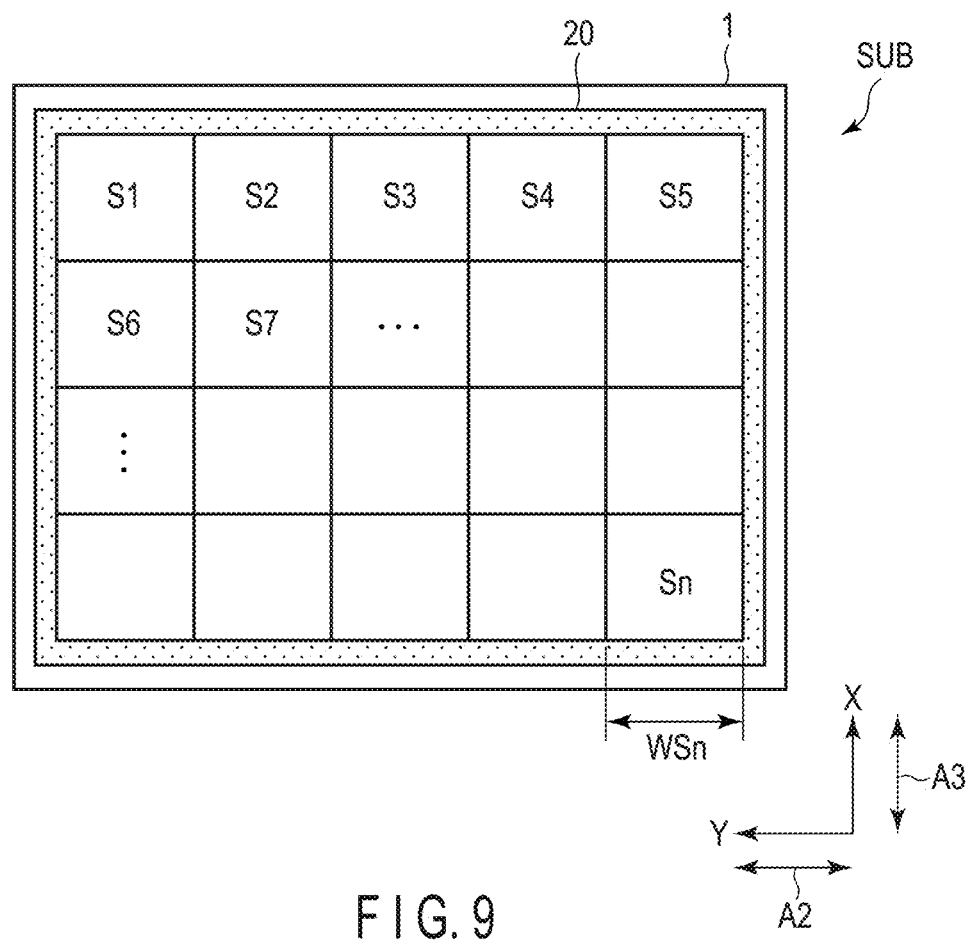
FIG. 9 is a diagram for explaining the area of the thin film 20 exposed via the mask MK shown in FIG. 8.

FIG. 9 is a diagram for explaining the area of the thin film 20 exposed via the mask MK shown in FIG. 8.

The thin film 20 is divided into a plurality of areas Sn for exposure as shown in the figure. When the mask MK shown in FIG. 8 is applied, a square exposure area EA is formed. Thus, the area Sn exposed in one exposure process is also square. Width WSn of each area Sn is equal to width WEA of the exposure area EA.

For example, area S1 of the thin film 20 is exposed in a first exposure process. Subsequently, the processing substrate SUB moves in the second direction A2, and area S2 of the thin film 20 is exposed in a second exposure process. This process is repeated until area S5 is exposed. After area S5 is exposed, the processing substrate SUB moves in the second direction A2 and the third direction A3, and area S6 is exposed.

Figure 10:
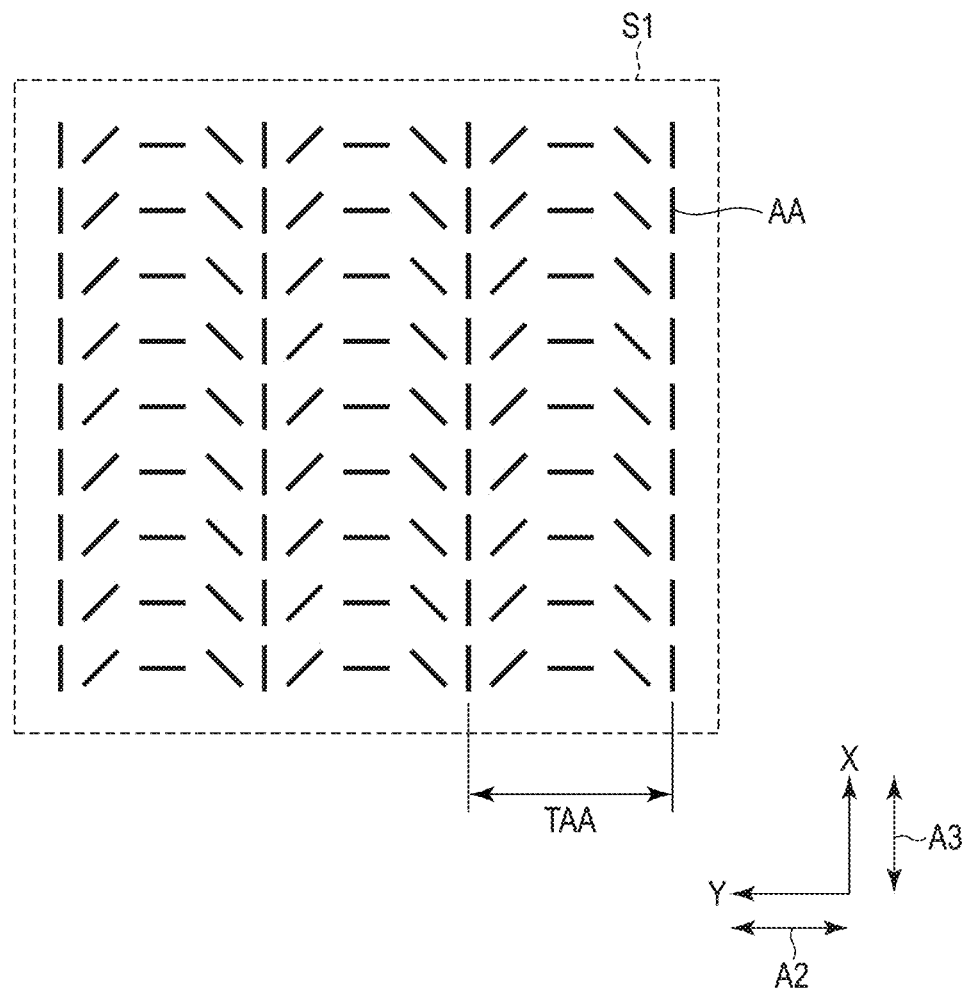
FIG. 10 is a diagram showing an example of the pattern of alignment axes AA in the exposed area S1.

FIG. 10 is a diagram showing an example of the pattern of alignment axes AA in the exposed area S1. Here, the figure shows the pattern of the alignment axes AA in a plane parallel to an X-Y plane in area S1. Each alignment axis AA is parallel to a direction which exerts an alignment restriction force for a liquid crystal molecule when the liquid crystal molecule is in contact with the alignment film. Each alignment axis AA is parallel to the long axis of the aligned liquid crystal molecule in an X-Y plane.

The directions of the alignment axes AA arranged in the second direction A2 are different from each other. In the example shown in the figure, the directions of the alignment axes AA arranged in the second direction A2 vary by a certain degree for each alignment axis AA clockwise from the left side to the right side of the figure. It should be noted that the directions of the alignment axes AA arranged in the third direction A3 are substantially coincident with each other.

By this configuration, the alignment pattern of the liquid crystal molecules LM11 shown in FIG. 3 is obtained.

When the interval between two alignment axes AA whose directions vary by 180 degrees is defined as period TAA, period TAA is equal to period T of the liquid crystal molecules LM11 shown in FIG. 3.

It should be noted that period TAA is determined by the incident angles and the wavelengths of the first circularly polarized light CP1 and the second circularly polarized light CP2 for the processing substrate SUB.

By adjusting the angle of reflection of the first linearly polarized light in the first optical system 204A shown in FIG. 6 and the angle of reflection of the second linearly polarized light in the second optical system 204B, the incident angles of the first circularly polarized light CP1 and the second circularly polarized light CP2 on the processing substrate SUB are changed. Thus, period TAA can be adjusted.

Figure 11:
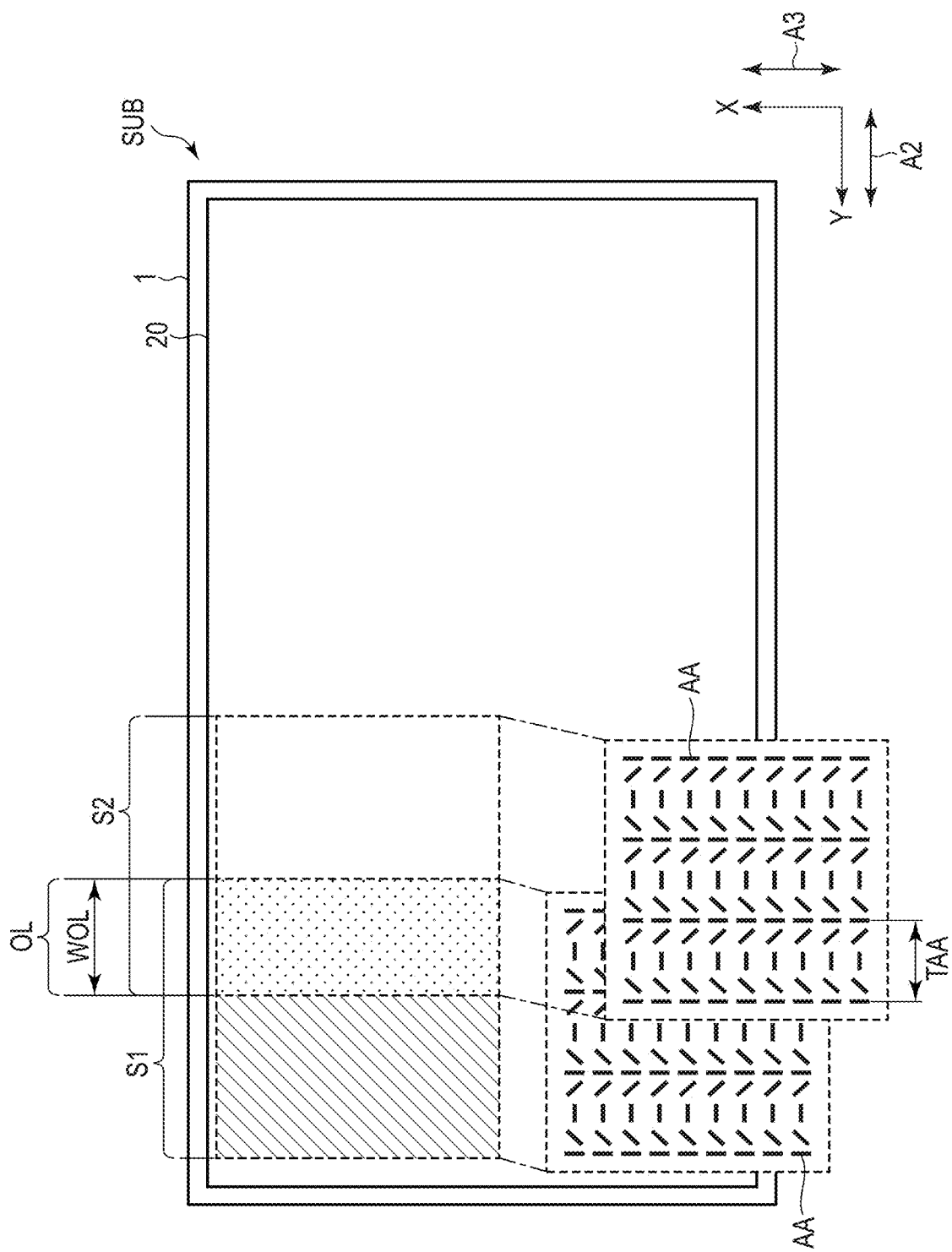
FIG. 11 is a diagram for explaining the overlapping area OL of areas S1 and S2 which are adjacent to each other in a second direction A2.

FIG. 11 is a diagram for explaining the overlapping area OL of areas S1 and S2 which are adjacent to each other in the second direction A2. For example, area S1 of the thin film 20 is exposed in the exposure area EA by the first exposure process at the first position P1 of FIG. 7. Subsequently, the processing substrate SUB is moved in the second direction A2. Area S2 of the thin film 20 is exposed in the exposure area EA by the second exposure process at the second position P2 of FIG. 7. At this time, as described above, the moving distance LSUB in which the processing substrate SUB is moved is less than width WEA of the exposure area EA. For this reason, area S1 and area S2 have an overlapping area OL which is subjected to multiple exposure.

In the overlapping area OL, the pattern of the alignment axes AA formed in area S1 by the first exposure process should be preferably coincident with the pattern of the alignment axes AA formed in area S2 by the second exposure process. Thus, width WOL of the overlapping area OL should be preferably an integral multiple of period TAA of the alignment axes AA. However, even if an inconsistency is generated in the alignment axes AA when the overlapping area OL is formed, it does not exert a large influence on the reflection property as a liquid crystal optical element.

Figure 12:
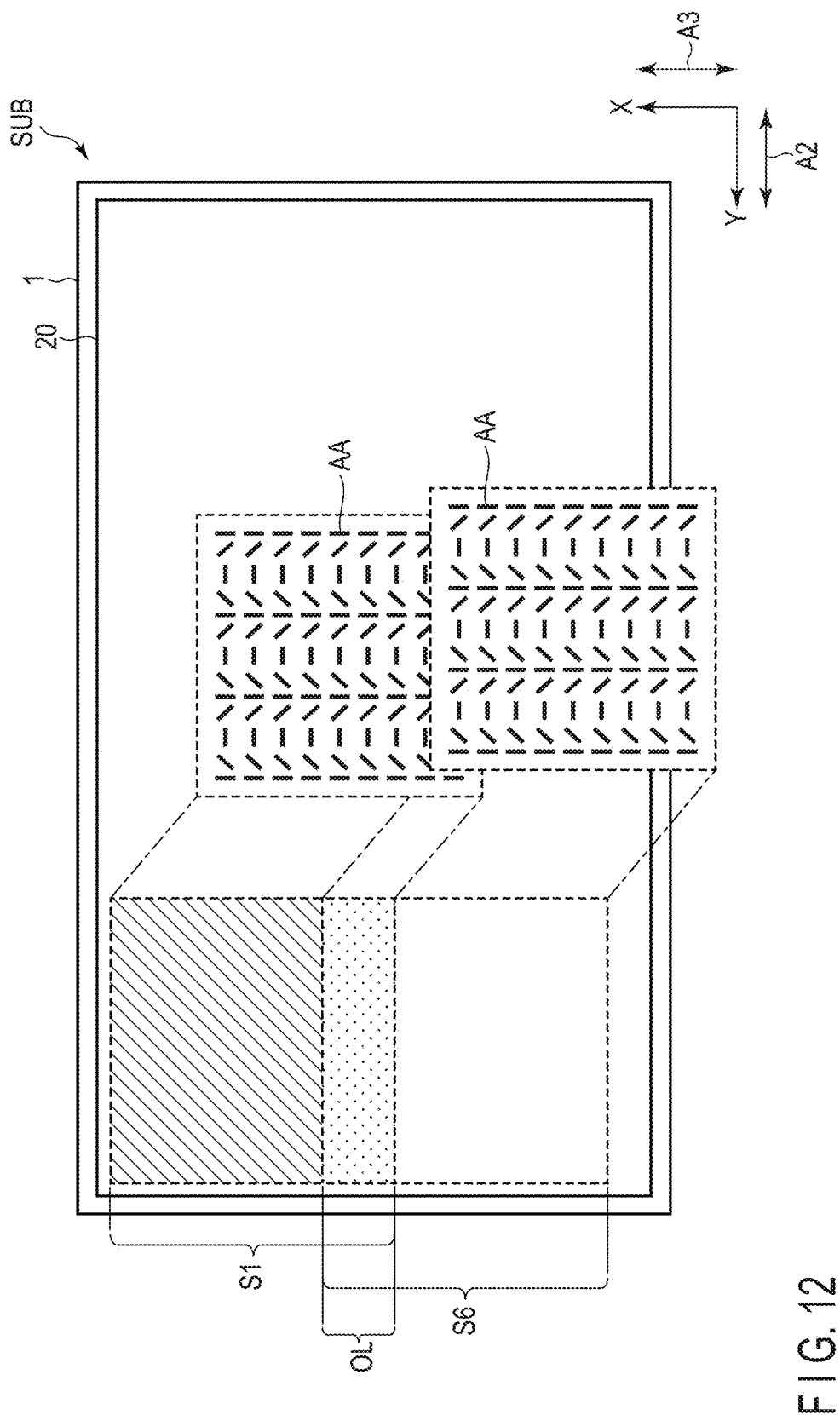
FIG. 12 is a diagram for explaining the overlapping area OL of areas S1 and S6 which are adjacent to each other in a third direction A3.

FIG. 12 is a diagram for explaining the overlapping area OL of areas S1 and S6 which are adjacent to each other in the third direction A3.

When area S6 of the thin film 20 is exposed in the exposure area EA after area S1 of the thin film 20 is exposed in the exposure area EA, in a manner similar to that of the explanation of FIG. 11, area S1 and area S6 have an overlapping area OL which is subjected to multiple exposure.

It is preferable that the pattern of the alignment axes AA formed in area S1 should be coincident with the pattern of the alignment axes AA formed in area S6 in the overlapping area OL. However, even if an inconsistency is generated in the alignment axes AA when the overlapping area OL is formed, it does not exert a large influence on the reflection property as a liquid crystal optical element.

Figure 13:
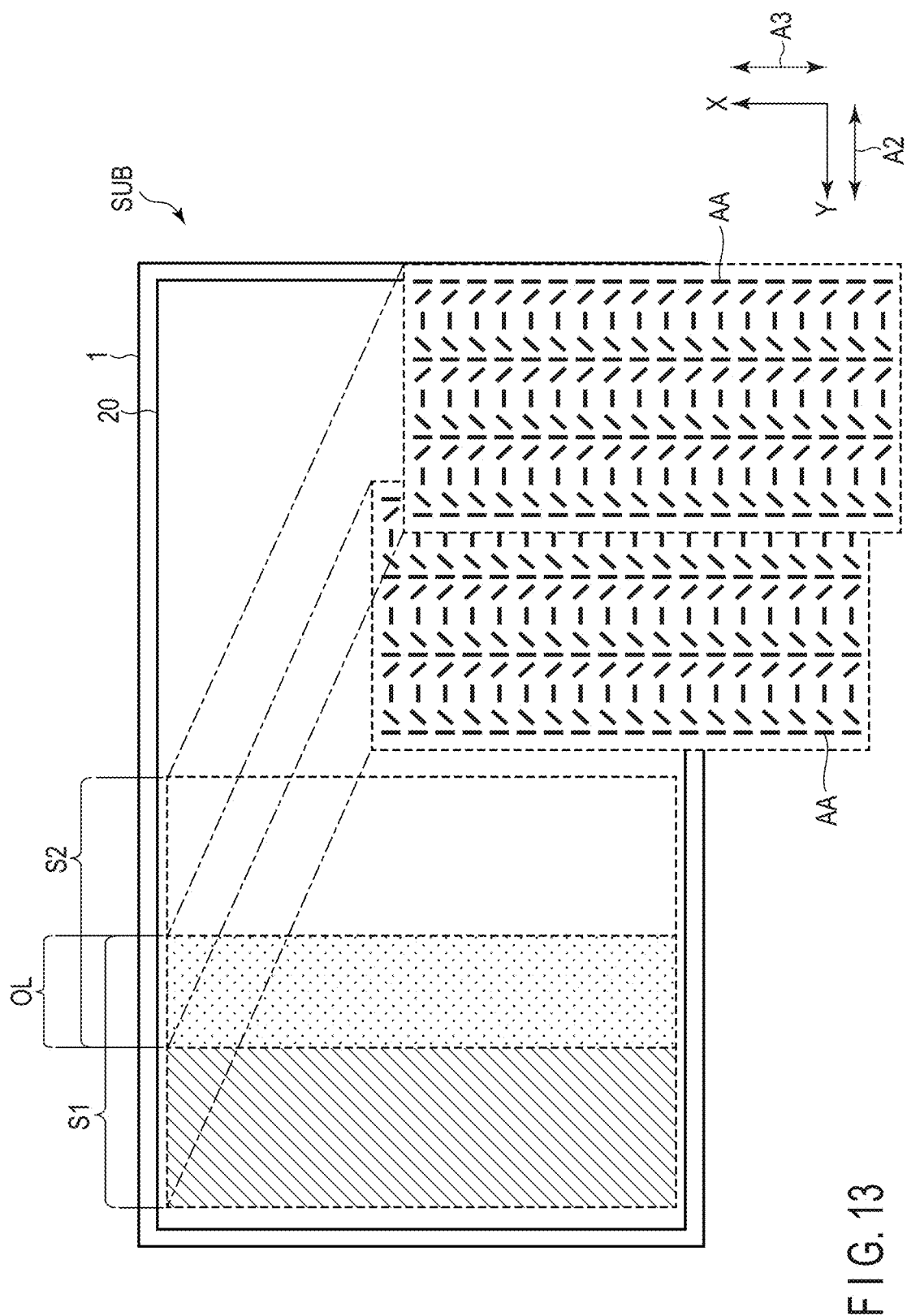
FIG. 13 is a diagram for explaining the overlapping area OL of areas S1 and S2 which are adjacent to each other in the second direction A2.

FIG. 13 is a diagram for explaining the overlapping area OL of areas S1 and S2 which are adjacent to each other in the second direction A2.

After area S1 of the thin film 20 is exposed in the exposure area EA, area S2 of the thin film 20 is exposed in the exposure area EA. In the example shown in FIG. 13, the exposure area EA is moved in the third direction A3 relative to the processing substrate SUB in each exposure process. Thus, each of areas S1 and S2 is formed into a rectangular shape extending in the third direction A3. It should be noted that, in each exposure process, the exposure area EA may be moved in the third direction A3 relative to the fixed processing substrate SUB, or the processing substrate SUB may be moved in the third direction A3 relative to the fixed exposure area EA.

Areas S1 and S2 formed in this manner have an overlapping area OL which is subjected to multiple exposure in a manner similar to that of the explanation of FIG. 11.

It is preferable that the pattern of the alignment axes AA formed in area S1 should be coincident with the pattern of the alignment axes AA formed in area S2 in the overlapping area OL. However, even if an inconsistency is generated in the alignment axes AA when the overlapping area OL is formed, it does not exert a large influence on the reflection property as a liquid crystal optical element.

The area of the alignment film 2 needs to be increased to increase the area of the liquid crystal optical element 100. In addition, the alignment film 2 needs to be formed so as to have a special pattern for the alignment axes AA in order to form the alignment pattern of the liquid crystal molecules LM11 shown in FIG. 3. For this reason, an interference exposure method is applied. In this method, interfering light is formed by circularly polarized light beams which rotate in opposite directions, and the thin film 20 for forming the alignment film 2 is exposed by interfering light. However, the area of the exposure area EA which can be formed in one exposure process is limited. Therefore, by dividing the thin film 20 into a plurality of areas and exposing each area, the alignment film 2 having a large area can be easily formed. In addition, the increase in the area of the liquid crystal optical element 100 can be easily realized.

Further, when the mask MK having the aperture AP with a polygonal shape is applied, the beam spot BS of circularly polarized light which reaches the exposure area EA is shaped based on the shape of the aperture AP. Thus, the thin film 20 having a large area can be exposed without forming a void (unexposed area).

Moreover, as a single mask MK is used in the alignment processing device 200 shown in FIG. 6, the cost can be reduced compared to a case where a plurality of masks are used.

Further, as the mask MK is provided near the processing substrate SUB, the outline of the beam spot can be made clear.

Even if the incident angles of the first circularly polarized light CP1 and the second circularly polarized light CP2 on the processing substrate SUB are changed to adjust period TAA of the alignment axes AA, as the mask MK is provided near the exposure area EA, there is no need to change the position of the mask MK.

Figure 14:
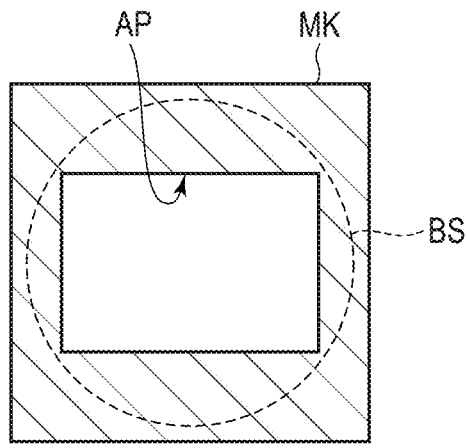
FIG. 14 is a plan view showing another example of the mask MK.

FIG. 14 is a plan view showing another example of the mask MK.

The example shown in FIG. 14 is different from that shown in FIG. 8 in respect that the mask MK has a rectangular aperture AP. The area of the aperture AP is less than that of the beam spot BS shown by the dotted line. Thus, the peripheral portion of the beam spot BS is shielded by the mask MK. The exposure area EA shown in FIG. 7 is formed into a rectangular shape corresponding to the shape of the aperture AP.

Figure 15:
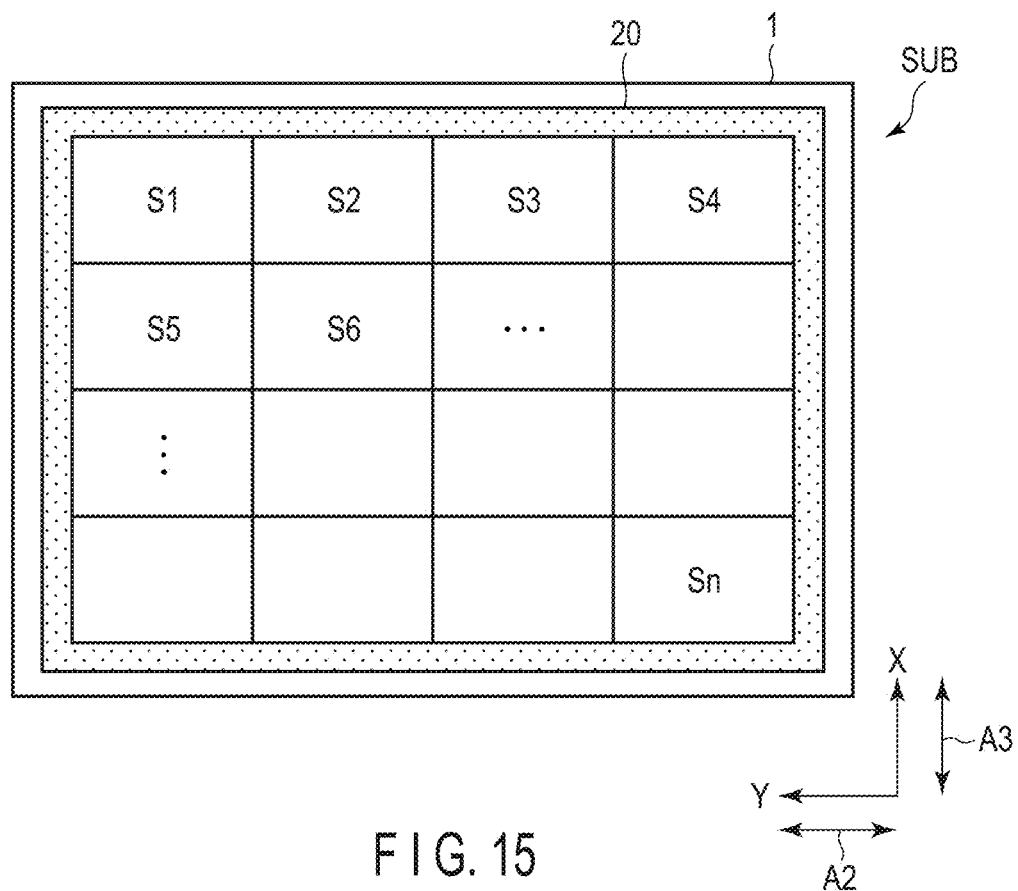
FIG. 15 is a diagram for explaining the area of the thin film 20 exposed via the mask MK shown in FIG. 14.

FIG. 15 is a diagram for explaining the area of the thin film 20 exposed via the mask MK shown in FIG. 14.

The thin film 20 is divided into a plurality of areas Sn for exposure as shown in the figure. When the mask MK shown in FIG. 14 is applied, a rectangular exposure area EA is formed. Thus, the area Sn exposed in one exposure process is also rectangular.

In a case where the mask MK having the rectangular aperture AP shown in FIG. 14 is applied to expose the thin film 20 having an equal area, the number of exposure processes may be reduced compared to a case where the mask MK having the square aperture AP shown in FIG. 8 is applied.

For example, in the example shown in FIG. 9, the thin film 20 is divided into twenty areas Sn, and twenty exposure processes are required.

In the example shown in FIG. 15, the thin film 20 is divided into sixteen areas Sn, and sixteen exposure processes are required. Thus, four exposure processes can be reduced.

Even in a case where each area is formed into a rectangular shape, in a manner similar to that of the above example, areas which are adjacent to each other have an overlapping area, and thus, no unexposed void is formed.

Figure 16:
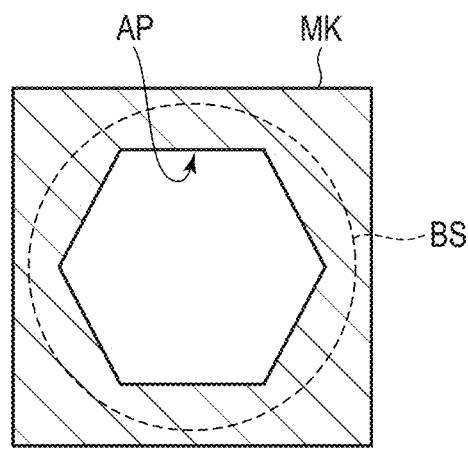
FIG. 16 is a plan view showing another example of the mask MK.

FIG. 16 is a plan view showing another example of the mask MK.

The example shown in FIG. 16 is different from that shown in FIG. 8 in respect that the mask MK has a regular hexagonal aperture AP. The area of the aperture AP is less than that of the beam spot BS shown by the dotted line. Thus, the peripheral portion of the beam spot BS is shielded by the mask MK. The exposure area EA shown in FIG. 7 is formed into a regular hexagonal shape corresponding to the shape of the aperture AP. When the beam spot BS is circular, the peripheral portion of the beam spot BS can be substantially isotropically shielded by making the center of the beam spot BS coincident with the center of the aperture AP.

Figure 17:
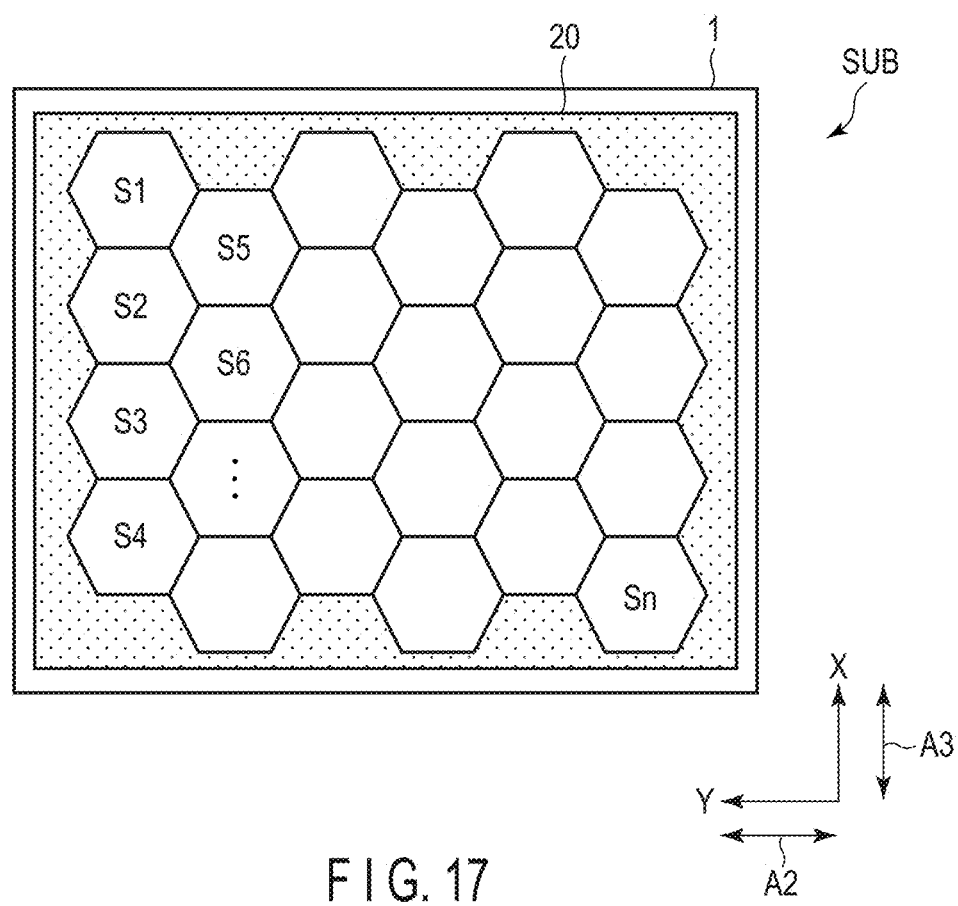
FIG. 17 is a diagram for explaining the area of the thin film 20 exposed via the mask MK shown in FIG. 16.

FIG. 17 is a diagram for explaining the area of the thin film 20 exposed via the mask MK shown in FIG. 16.

The thin film 20 is divided into a plurality of areas Sn for exposure as shown in the figure. When the mask MK shown in FIG. 16 is applied, a regular hexagonal exposure area EA is formed. Thus, the shape of the area Sn exposed in one exposure process is also a regular hexagon.

Even in a case where each area is formed into a regular hexagonal shape, in a manner similar to that of the above examples, areas which are adjacent to each other have an overlapping area, and thus, no unexposed void is formed.

Figure 18:
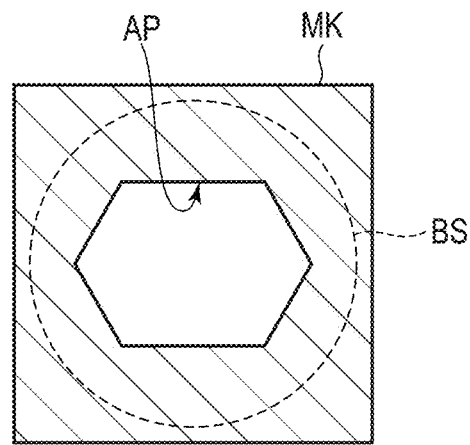
FIG. 18 is a plan view showing another example of the mask MK.

FIG. 18 is a plan view showing another example of the mask MK.

The example shown in FIG. 18 is different from that shown in FIG. 8 in respect that the mask MK has an aperture AP having a hexagonal shape which is horizontally long. The area of the aperture AP is less than that of the beam spot BS shown by the dotted line. Thus, the peripheral portion of the beam spot BS is shielded by the mask MK. The exposure area EA shown in FIG. 7 is formed into a hexagonal shape corresponding to the shape of the aperture AP.

Figure 19:
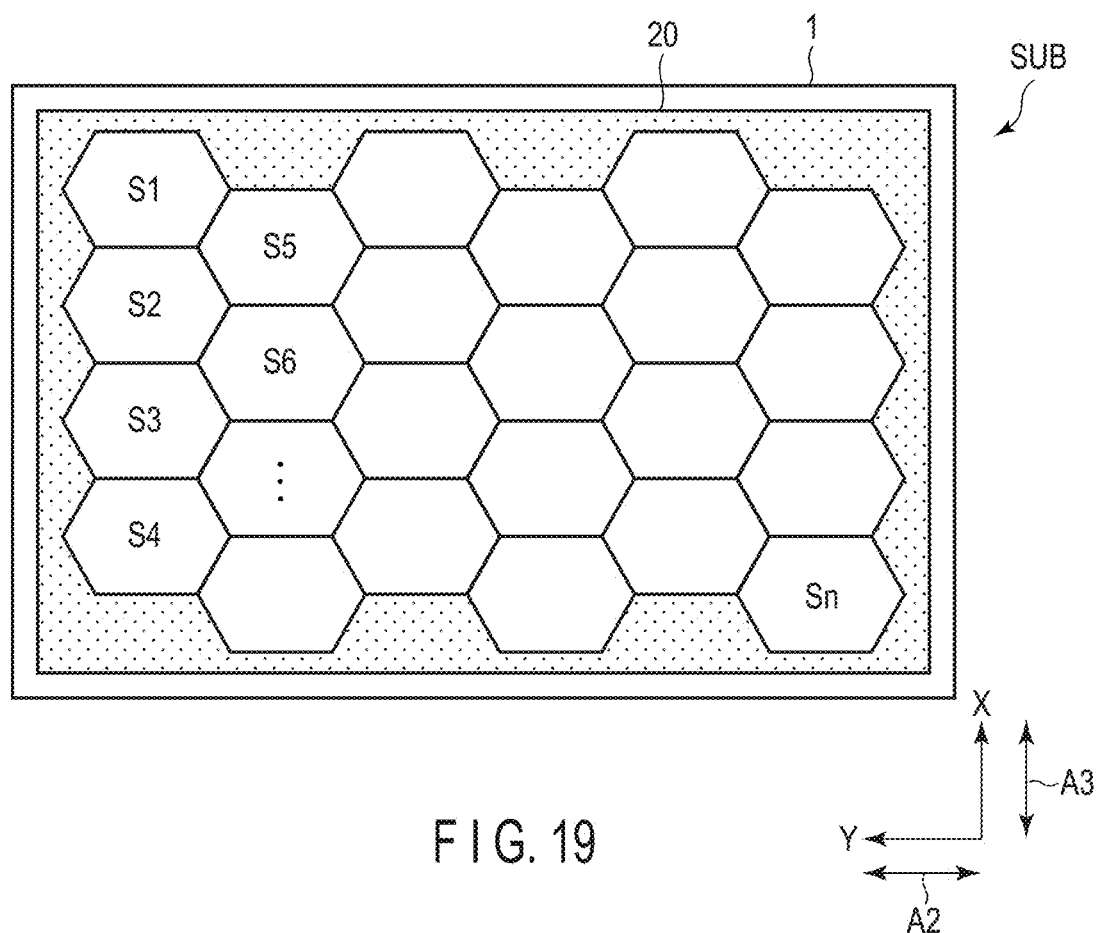
FIG. 19 is a diagram for explaining the area of the thin film 20 exposed via the mask MK shown in FIG. 18.

FIG. 19 is a diagram for explaining the area of the thin film 20 exposed via the mask MK shown in FIG. 18.

The thin film 20 is divided into a plurality of areas Sn for exposure as shown in the figure. When the mask MK shown in FIG. 18 is applied, a hexagonal exposure area EA is formed. Thus, the area Sn exposed in one exposure process is also hexagonal.

Even in a case where each area is formed into a hexagonal shape, in a manner similar to that of the above examples, areas which are adjacent to each other have an overlapping area, and thus, no unexposed void is formed.

Figure 20:
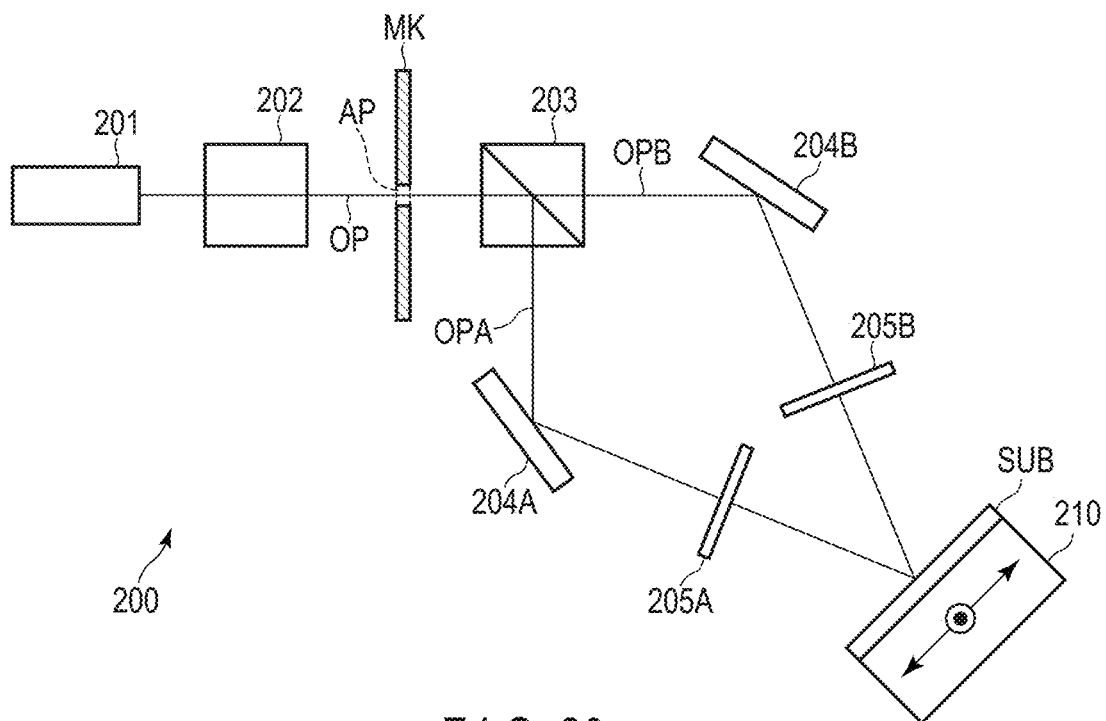
FIG. 20 is a diagram showing another configuration example of the alignment processing device 200.

FIG. 20 is a diagram showing another configuration example of the alignment processing device 200.

The configuration example shown in FIG. 20 is different from that shown in FIG. 6 in respect that the mask MK is provided in optical path OP between the light source 201 and the polarizing beam splitter 203. In the example shown in the figure, the mask MK is provided between the optical magnification system 202 and the polarizing beam splitter 203. The aperture AP of the mask MK is polygonal. Any one of the shapes shown in FIG. 8, FIG. 14, FIG. 16 and FIG. 18 may be applied.

In this configuration example, effects similar to those of the above description are obtained.

Figure 21:
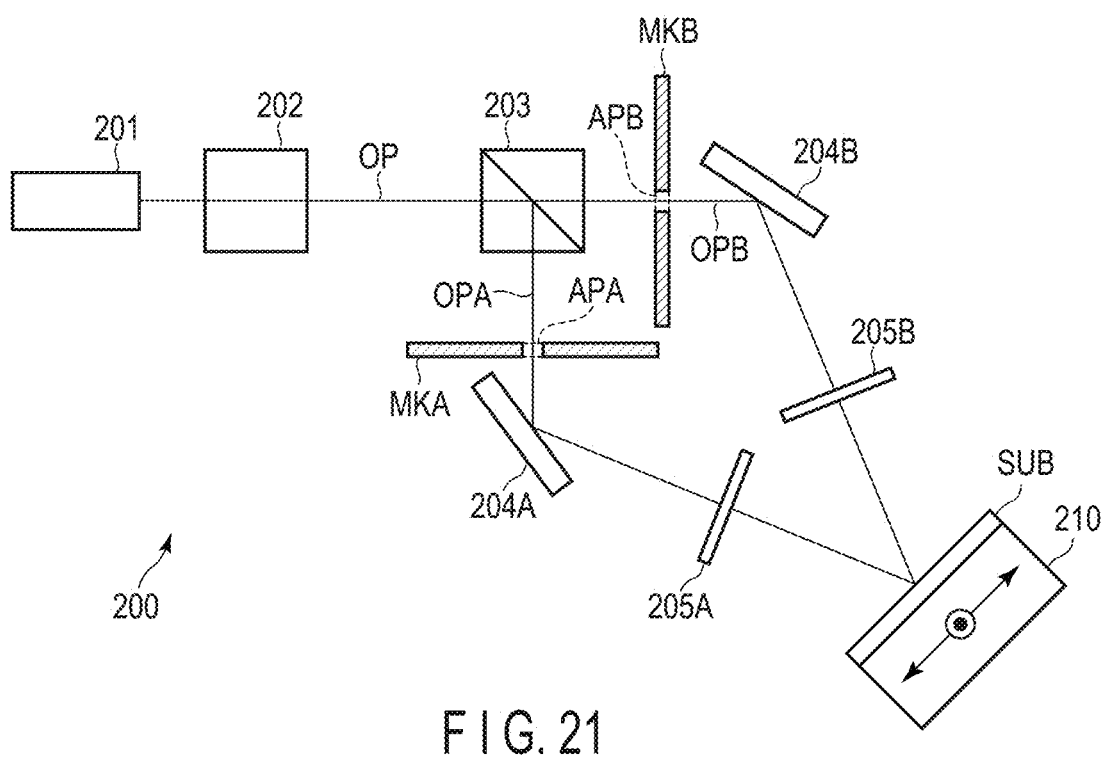
FIG. 21 is a diagram showing another configuration example of the alignment processing device 200.

FIG. 21 is a diagram showing another configuration example of the alignment processing device 200.

The configuration example shown in FIG. 21 is different from that shown in FIG. 6 in the following respects. A first mask MKA is provided in optical path OPA between the polarizing beam splitter 203 and the first optical system 204A, and a second mask MKB is provided in optical path OPB between the polarizing beam splitter 203 and the second optical system 204B. The shape of aperture APA of the first mask MKA and the shape of aperture APB of the second mask MKB are the same as each other. The shape of each of apertures APA and APB is polygonal, and any one of the shapes shown in FIG. 8, FIG. 14, FIG. 16 and FIG. 18 may be applied.

In this configuration example, effects similar to those of the above description are obtained.

Figure 22:
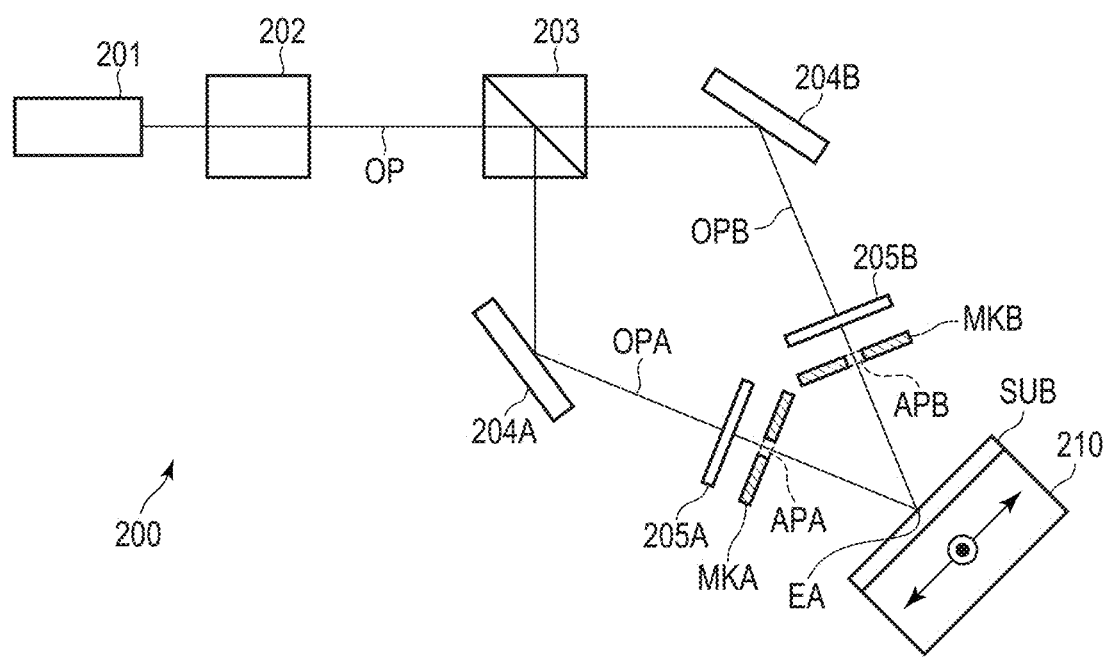
FIG. 22 is a diagram showing another configuration example of the alignment processing device 200.

FIG. 22 is a diagram showing another configuration example of the alignment processing device 200.

The configuration example shown in FIG. 22 is different from that shown in FIG. 6 in the following respects. The first mask MKA is provided in optical path OPA between the first retardation film 205A and the exposure area EA, and the second mask MKB is provided in optical path OPB between the second retardation film 205B and the exposure area EA. The shape of aperture APA of the first mask MKA and the shape of aperture APB of the second mask MKB are the same as each other. The shape of each of apertures APA and APB is polygonal, and any one of the shapes shown in FIG. 8, FIG. 14, FIG. 16 and FIG. 18 may be applied.

In this configuration example, effects similar to those of the above description are obtained.

As explained above, the embodiments can provide an alignment processing device for manufacturing a liquid crystal optical element whose area can be increased and a manufacturing method of such a liquid crystal optical element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An alignment processing device comprising:
   a light source;
   a polarizing beam splitter which divides light emitted from the light source into first linearly polarized light and second linearly polarized light;
   a mask provided between the light source and the polarizing beam splitter;
   a first optical system which guides the first linearly polarized light to an exposure area;
   a second optical system which guides the second linearly polarized light to the exposure area;
   a first retardation film which converts the first linearly polarized light into first circularly polarized light;

a second retardation film which converts the second linearly polarized light into second circularly polarized light which rotates in an opposite direction of the first circularly polarized light;

a moving mechanism configured to move a processing substrate in which a thin film is formed on a main surface of a transparent substrate in a direction parallel to the main surface; and a controller which controls the light source and the moving mechanism, wherein the mask has an aperture formed into a polygonal shape, interfering light is formed in the exposure area by the first circularly polarized light and the second circularly polarized light, and the controller performs control so as to repeat a process of exposing part of an area of the thin film by the interfering light and a process of moving the processing substrate.

2. The alignment processing device of claim 1, wherein a moving distance of the processing substrate is less than a width of the exposure area.

3. The alignment processing device of claim 1, wherein the shape of the aperture is rectangular or hexagonal.

4. An alignment processing device comprising:

a light source;

a polarizing beam splitter which divides light emitted from the light source into first linearly polarized light and second linearly polarized light;

a first optical system which guides the first linearly polarized light to an exposure area;

a second optical system which guides the second linearly polarized light to the exposure area;

a first retardation film which converts the first linearly polarized light into first circularly polarized light;

a second retardation film which converts the second linearly polarized light into second circularly polarized light which rotates in an opposite direction of the first circularly polarized light;

a first mask provided between the polarizing beam splitter and the first retardation film;

a second mask provided between the polarizing beam splitter and the second retardation film, a moving mechanism configured to move a processing substrate in which a thin film is formed on a main surface of a transparent substrate in a direction parallel to the main surface; and a controller which controls the light source and the moving mechanism, wherein each of the first mask and the second mask has an aperture formed into a polygonal shape, interfering light is formed in the exposure area by the first circularly polarized light and the second circularly polarized light, and the controller performs control so as to repeat a process of exposing part of an area of the thin film by the interfering light and a process of moving the processing substrate.

5. An alignment processing device comprising:

a light source;

a polarizing beam splitter which divides light emitted from the light source into first linearly polarized light and second linearly polarized light;

a first optical system which guides the first linearly polarized light to an exposure area;

a second optical system which guides the second linearly polarized light to the exposure area;

a first retardation film which converts the first linearly polarized light into first circularly polarized light;

a second retardation film which converts the second linearly polarized light into second circularly polarized light which rotates in an opposite direction of the first circularly polarized light;

a first mask provided between the first retardation film and the exposure area;

a second mask provided between the second retardation film and the exposure area, a moving mechanism configured to move a processing substrate in which a thin film is formed on a main surface of a transparent substrate in a direction parallel to the main surface; and a controller which controls the light source and the moving mechanism, wherein each of the first mask and the second mask has an aperture formed into a polygonal shape, interfering light is formed in the exposure area by the first circularly polarized light and the second circularly polarized light, and the controller performs control so as to repeat a process of exposing part of an area of the thin film by the interfering light and a process of moving the processing substrate.

6. The alignment processing device of claim 1, wherein the light source is a laser light source which emits light in a wavelength range of ultraviolet.

7. The alignment processing device of claim 1, wherein the light source is a laser light source which emits light in a wavelength range of a blue component.

\* \* \* \* \*